US012084908B2

(12) United States Patent
Hatch et al.

(10) Patent No.: US 12,084,908 B2
(45) Date of Patent: Sep. 10, 2024

(54) DOOR AND WINDOW FRAMES, AND RELATED METHODS

(71) Applicant: SAS IP, LLC, Peoria, AZ (US)

(72) Inventors: William Michael Hatch, Peoria, AZ (US); Phil De La O, Jr., Glendale, AZ (US)

(73) Assignee: SAS IP, LLC, Peoria, AZ (US)

( * ) Notice: Subject to any disclaimer, the term of this patent is extended or adjusted under 35 U.S.C. 154(b) by 403 days.

(21) Appl. No.: 17/387,926

(22) Filed: Jul. 28, 2021

(65) Prior Publication Data

US 2021/0355742 A1 Nov. 18, 2021

Related U.S. Application Data

(63) Continuation of application No. PCT/US2020/015317, filed on Jan. 28, 2020.

(60) Provisional application No. 62/797,497, filed on Jan. 28, 2019.

(51) Int. Cl.

| | |
|---|---|
| ***E06B 1/20*** | (2006.01) |
| ***E06B 1/12*** | (2006.01) |
| ***E06B 1/30*** | (2006.01) |
| ***E06B 1/52*** | (2006.01) |
| ***E06B 3/24*** | (2006.01) |

(52) U.S. Cl.

CPC .................. *E06B 1/20* (2013.01); *E06B 1/12* (2013.01); *E06B 1/30* (2013.01); *E06B 1/52* (2013.01); *E06B 3/24* (2013.01)

(58) Field of Classification Search

CPC ..... E06B 1/20; E06B 3/24; E06B 1/30; E06B 1/12; E06B 1/52

USPC ... 52/217, 656.4, 211, 204.56, 656.1, 656.2; 49/505

See application file for complete search history.

(56) References Cited

U.S. PATENT DOCUMENTS

| | | | | |
|---|---|---|---|---|
| 899,259 A * | 9/1908 | Ohnstrand | ................ | E06B 1/20 49/505 |
| 2,538,925 A | 1/1951 | Steffan | | |
| 2,718,291 A | 9/1955 | Goldberg | | |
| 2,742,117 A * | 4/1956 | Tolman | ................ | E06B 3/9624 49/505 |
| 3,233,381 A | 2/1966 | Von Wedel | | |
| 3,299,592 A | 1/1967 | Cable | | |
| 3,788,019 A * | 1/1974 | Kiselewski | ........... | E06B 1/6023 52/214 |

(Continued)

FOREIGN PATENT DOCUMENTS

| | | |
|---|---|---|
| AU | 4081989 A | 3/1990 |
| DE | 2352476 A1 | 4/1975 |

(Continued)

OTHER PUBLICATIONS

International Search Report and Written Opinion for PCT/US2020/015317, dated May 28, 2020.

*Primary Examiner* — Brent W Herring
(74) *Attorney, Agent, or Firm* — BRYAN CAVE LEIGHTON PAISNER LLP

(57) ABSTRACT

Systems and methods are described herein to provide a frame assembly adjustable to fit different sized walls. The frame assembly can comprise one or more portions for receiving wall coverings when the frame assembly is coupled to an end of a wall. In various embodiments, the frame assembly can be a door frame assembly or a window frame assembly. Other embodiments are disclosed herein.

21 Claims, 11 Drawing Sheets

(56) References Cited

U.S. PATENT DOCUMENTS

| | | | | | |
|---|---|---|---|---|---|
| 3,906,671 | A * | 9/1975 | Maldonado | E06B 1/20 | 49/505 |
| 3,928,953 | A * | 12/1975 | Mazzoni | E06B 3/66328 | 52/786.13 |
| 4,034,513 | A | 7/1977 | Richardson | | |
| 4,251,962 | A * | 2/1981 | Langenhorst | E06B 1/603 | 49/504 |
| 4,663,906 | A | 5/1987 | Weinar | | |
| 4,912,879 | A * | 4/1990 | Mozuras | E06B 1/20 | 49/505 |
| 4,986,034 | A * | 1/1991 | Mozuras | E06B 1/20 | 49/505 |
| 5,187,898 | A * | 2/1993 | McKann | E06B 1/20 | 49/505 |
| 5,203,130 | A * | 4/1993 | Freelove | E06B 1/64 | 52/211 |
| 5,392,574 | A | 2/1995 | Sayers | | |
| 5,528,869 | A * | 6/1996 | Boomer | E06B 1/30 | 49/505 |
| 5,941,032 | A * | 8/1999 | Lydon, Jr. | E06B 3/5821 | 52/656.2 |
| 5,987,843 | A * | 11/1999 | Canfield | E06B 1/34 | 49/504 |
| 6,055,783 | A | 5/2000 | Guhl et al. | | |
| 6,282,851 | B1 | 9/2001 | Beaton | | |
| 6,295,779 | B1 * | 10/2001 | Canfield | E06B 1/32 | 49/504 |
| 9,115,501 | B2 * | 8/2015 | Rucinski | E06B 1/6023 | |
| 11,203,896 | B2 * | 12/2021 | Jaskiewicz | E06B 7/23 | |
| 2003/0046886 | A1 * | 3/2003 | Potts | E06B 1/20 | 52/212 |
| 2022/0389748 | A1 * | 12/2022 | Glover | H05K 9/0081 | |

FOREIGN PATENT DOCUMENTS

| | | | |
|---|---|---|---|
| DE | 2515663 | A1 | 10/1976 |
| FR | 1258489 | A | 4/1961 |
| FR | 1365376 | A | 7/1964 |
| KR | 200375514 | | 3/2005 |
| KR | 101263956 | | 5/2013 |
| WO | 2005121483 | A1 | 12/2005 |

* cited by examiner

DOOR AND WINDOW FRAMES, AND RELATED METHODS

CROSS-REFERENCE TO RELATED APPLICATION

This application is a continuation of PCT Application Number PCT/US2020/015317, filed Jan. 28, 2020, which claims the benefit of U.S. Provisional Patent Application Ser. No. 62/797,497, filed Jan. 28, 2019. PCT Application Number PCT/US2020/015317 and U.S. Provisional Patent Application Ser. No. 62/797,497 are incorporated herein by reference in their entireties.

TECHNICAL FIELD

This disclosure relates generally to construction elements, and relates more particularly to door frames and window frames, and related methods.

BACKGROUND

In a construction environment, it is often desirable to protect an underlying bare surface (such as, for example, a wall or floor) from dust, dirt, grime, grease, bacteria, insects, animals, and any other deleterious elements. For example, in a commercial environment (such as, for example, a restaurant, cafeteria, food stand, or cleanroom) surface finishing items are generally installed over a bare surface to create a finished or working surface. Generally, such surface finishing items cover and treat bare surfaces using one or more of wall board, sheet rock, plaster, backsplashes, tile, wallpaper, carpeting, wood, paneling, vinyl, and other similar materials.

With the installation of these surface finishing items, it is typical to install conventional construction trim elements (such as, for example, baseboards, crown molding, wainscoting, door frames, and window frames) to cover or seal a transition from one surface finishing item to the other. Such conventional construction trim elements have inherent flaws that allow or promote the above-mentioned deleterious elements to accumulate or grow at the location of those conventional construction trim elements and/or contact base surfaces underlying the surface finishing items. For example, almost all of these conventional construction trim elements are installed using standard securing techniques (such as, for example, nails, staples, glues, and caulks) that are ineffective to seal the surface finishing items. Moreover, such conventional construction trim elements may degrade, peel, warp, etc. over time by using such standard securing techniques.

BRIEF DESCRIPTION OF THE DRAWINGS

A more complete understanding of a construction element may be derived by referring to the detailed description and claims when considered in connection with the following illustrative figures. In the following figures, like reference numbers refer to similar elements and steps throughout the figures.

Figure 1:
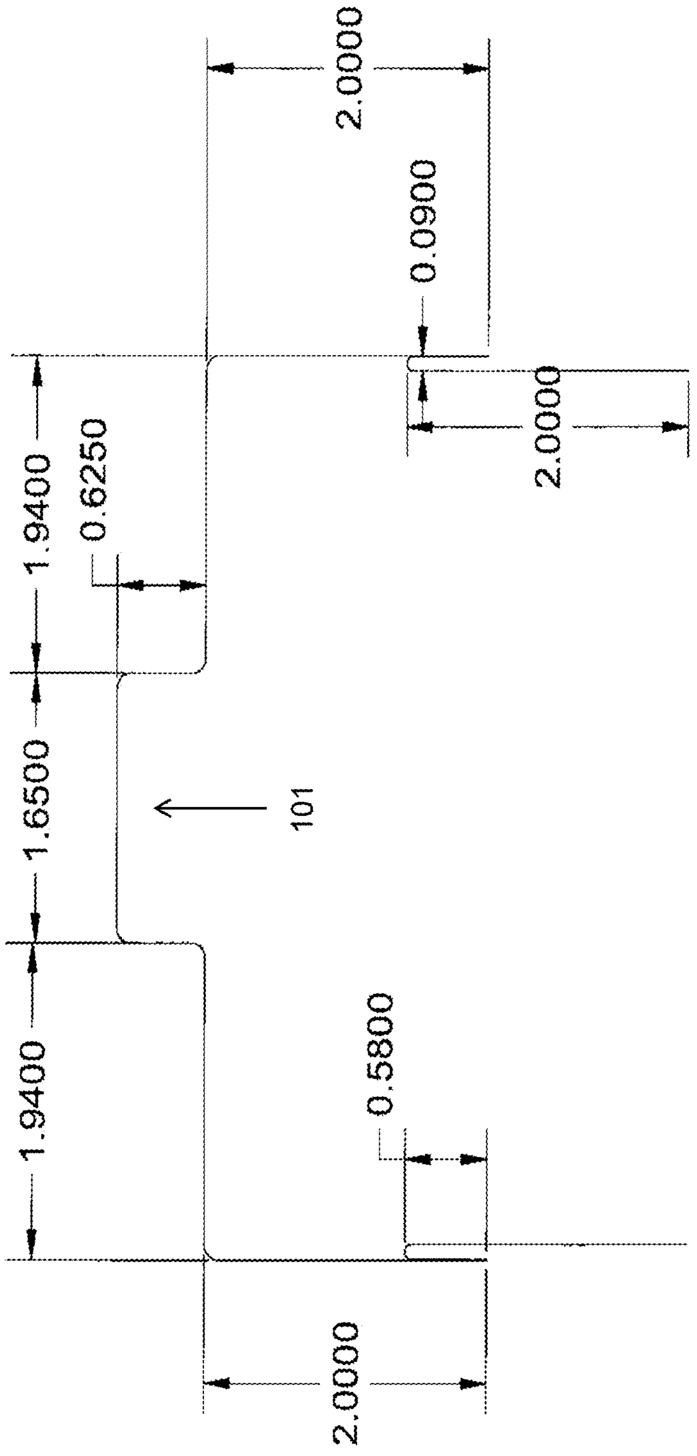
FIG. 1 illustrates an exemplary embodiment of a door frame.

Elements and/or any steps among the figures are illustrated for simplicity and clarity and have not necessarily been rendered according to any particular sequence. For example, steps that may be performed concurrently or in different order may be illustrated in the figures to help to improve understanding of embodiments of the construction element. Moreover, elements may be constructed in various combinations and/or permutations.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more mechanical elements may be mechanically coupled together, but not be electrically or otherwise coupled together. Coupling may be for any length of time, e.g., permanent or semi-permanent or only for an instant. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In the same or different embodiments, "approximately" can mean within plus or minus five percent of the stated value. In further embodiments, "approximately" can mean within plus or minus three percent of the stated value. In yet other embodiments, "approximately" can mean within plus or minus one percent of the stated value. In some embodiments, "approximately" can mean within plus or minus ten degrees of the stated value. In the same or different embodiments, "approximately" can mean within plus or minus five degrees of the stated value. In yet other embodiments, "approximately" can mean within plus or minus one degree of the stated value.

As used herein, the terms "comprise", "comprises", "comprising", "having", "including", "includes", "is" or any variation thereof, are intended to reference a non-exclusive inclusion, such that a process, method, article, composition, system, device, or apparatus that comprises a list of elements does not include only those elements recited, but may also include other elements not expressly listed or inherent to such process, method, article, composition, system, device, or apparatus. Other combinations and/or modifications of the above-described structures, arrangements, applications, proportions, elements, materials or components used in the practice of a construction element, in addition to those not specifically recited, may be varied or otherwise particularly adapted to specific environments, manufacturing specifications, design parameters or other operating requirements without departing from the general principles of the same.

DESCRIPTION OF EXAMPLES OF EMBODIMENTS

A construction element may be described herein by terms of various functional elements and various method steps. Such functional elements may be realized by any number of hardware components adapted to perform generalized or specific functions to achieve various results. For example, the construction element may employ various construction element components, e.g., various materials, such as stainless steel, standard steel grades, aluminum, copper, various alloy combinations, vinyl, and any other natural and/or synthetic materials whether now known or developed in the future. Moreover, the construction element may comprise various structural configurations, for example, tongue and grooves, slots, laps, welds, snaps, latches, wells, and the like, which may carry out a variety of functions. And each structural configuration may comprise any number or permutations of configurations; for example, various scale, gauge, finish, size, geometry, surface texture, and the like may be employed.

Those skilled in the art will understand that the construction element may be practiced as part of any variety of construction elements and/or finishing applications, whether for commercial, industrial, and/or residential purpose; and any particular system, method, and/or purpose described herein is merely exemplary for the construction element. Those skilled in the art will further understand that the construction element may be practiced by any number of other applications and environments, whether now known or developed in the future. Finally, those skilled in the art will understand that the construction element may employ any number of conventional techniques for manufacturing, installing, packaging, marketing, distributing, and/or selling the construction element.

In many embodiments, a construction element (such as, for example, baseboards, crown molding, wainscoting, door frames, and window frames) can (1) operate to seal and/or operate as a transition from one surface finishing item to another (such as, for example, wall board, sheet rock, plaster, backsplashes, tile, wallpaper, carpeting, wood, paneling, or vinyl), (2) prevent deleterious materials (such as, for example, dirt, grime, grease, bacteria, insects, or animals) from accumulating or growing at the location of the construction element, and (3) prevent the deleterious materials from contacting the base surfaces underlying the surface finishing items. In some embodiments, the construction element can be referred to as a construction trim element.

Various representative implementations of a door frame assembly or window frame assembly can be applied to any construction system.

FIG. 1 illustrates an exemplary embodiment of a door frame assembly 100. The door frame assembly is shown in a top-down view. In many embodiments, the door frame assembly can be bent into shape from a single, integrated piece of material. In the same or different embodiments, the door frame assembly can be made of metal, such as 20 gauge 304 stainless steel. In other embodiments, the door frame assembly can be made of a different type or metal or a different type of material that is malleable or pliable. The dimensions shown in FIG. 1 are exemplary, are shown in inches (and can be converted to centimeters by multiplying the numerical values in FIG. 1 by 2.54), and can vary depending on the requirements for the door frame assembly.

The door frame assembly can replace the typical door trim that is often used around a door. For example, the door frame assembly can be inserted over an end of a wall (e.g., a doorjamb) and can be attached to the wall with mechanical fasteners such as nails, rivets, and/or screws. The door frame assembly can have holes to receive the mechanical fasteners. All or a portion of the door frame assembly can be flush with the end of the wall.

Portion 101 of door frame assembly 100 that is shown as 1.65 inches wide can serve as a typical door stop for a closed door. Ends of wall coverings that cover the wall can be inserted into the upside-down U-shaped portions on the right and left sides of the door frame assembly, as shown in FIG. 1. In many embodiments, the wall coverings (not shown in FIG. 1) can be made of composite materials such as fiber-reinforced plastic or fiber-reinforced polymer (FRP). In other embodiments, the wall coverings can be made of other materials.

Figure 2:
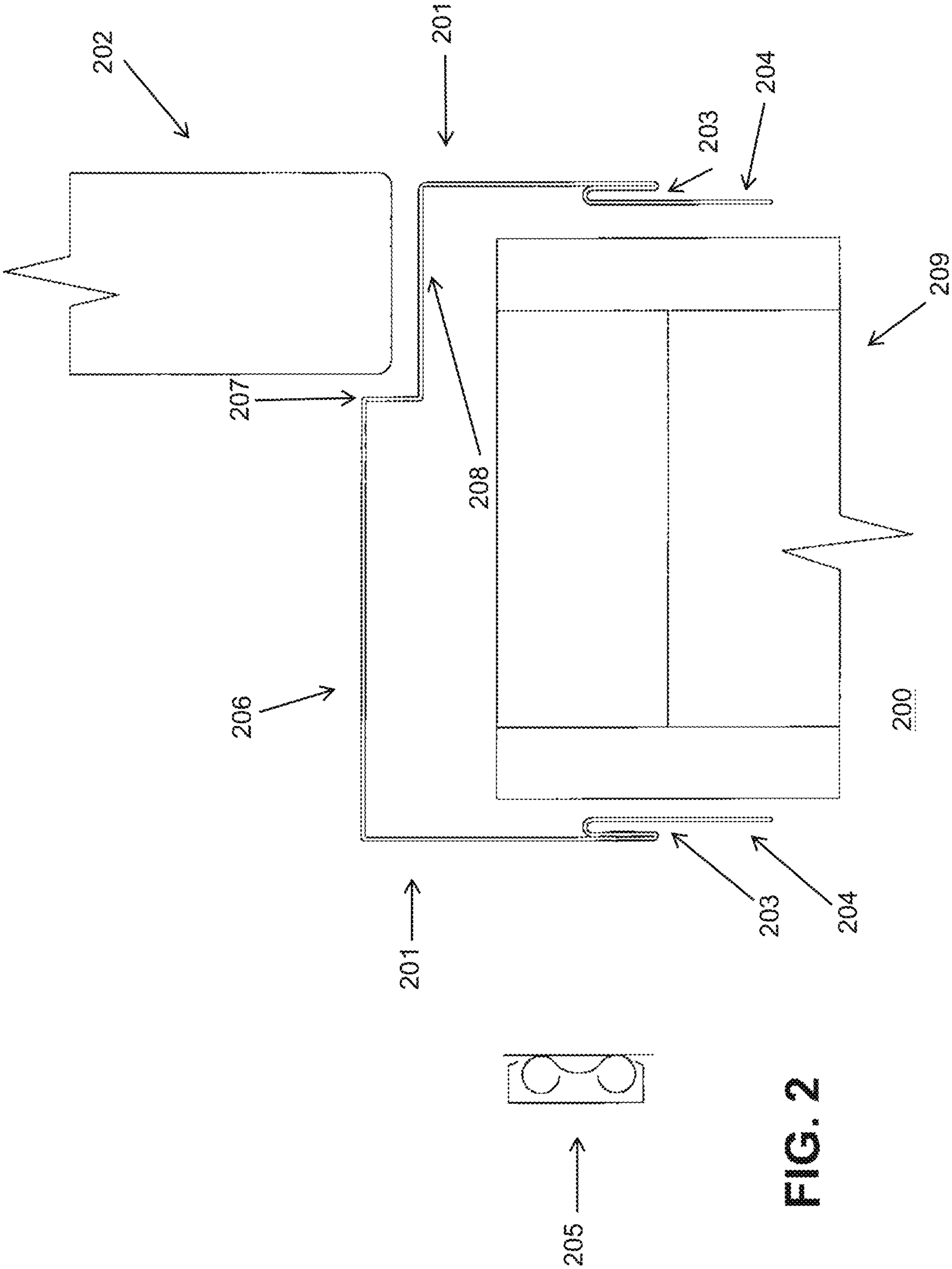
FIG. 2 illustrates an exploded view of an exemplary embodiment of a door frame assembly.

Turning to the next drawing, FIG. 2 illustrates an exploded view of an exemplary embodiment of a door frame assembly 200 at an end of wall 209. The door frame assembly is shown in a top-down view. (The door frame assembly shown in FIG. 2 is too large for the wall shown in FIG. 2, and is drawn larger than desired in FIG. 2 to more easily explain the concepts presented herein.) Door frame assembly 200 has portions 201, portions 203, portions 204, raised portion 206, edge 207, and portion 208.

In many embodiments, the door frame assembly can be bent into shape from a single, integrated piece of material. In the same or different embodiments, the door frame assembly can be made of a metal, such as 20 gauge 304 stainless steel. In other embodiments, the door frame assembly can be made of a different type of metal or other material that is malleable or pliable.

The door frame assembly can replace the typical door trim that is often used around a door. For example, the door frame assembly can be inserted over an end of wall 209 and serve as a doorjamb. Portions 204 of door frame assembly 200 can be attached to the wall with mechanical fasteners such as nails, rivets, and/or screws. The door frame assembly can have holes at portions 204 to receive the mechanical fasteners.

All or a portion of the door frame assembly can be flush with the end of the wall. For example, portions 204 can be flush with the end of wall 209, while raised portion 206 would not be flush with the end of the wall, as illustrated in FIG. 2. In this configuration, raised portion 206 can provide a spring-like effect on door 202 if door 202 contacts edge 207 of raised portion 206 when door 202 is closing. In one embodiment, portion 208 of door frame assembly 200 is flush with the end of wall 209, and in another embodiment, portion 208 is not flush with the end of wall 209, similar to raised portion 206, except that a distance separating portion 208 from the end of wall 209 would be smaller than a distance separating raised portion 206 from the end of wall 209. In any of these embodiments, portions 201 of door frame assembly 200 can be separated from and not flush with the end of wall 209, while portions 204 can be flush with the end of wall 209.

Ends of wall coverings that cover wall 209 can be inserted into the upside-down U-shaped portions on the right and left sides of the door frame assembly, as indicated by portions 203 in FIG. 2. In many embodiments, the wall coverings (not shown in FIG. 2) can be made of composite materials such as fiber-reinforced plastic or fiber-reinforced polymer (FRP). In other embodiments, the wall coverings can be made of other materials.

In a different embodiment, a spring inside element 205 can be attached to the door frame assembly (and possibly the wall) using one or more mechanical fasteners such as one or more nails, rivets, and/or screws. In this different embodiment, there can be multiple springs attached to the door frame assembly in a straight line approximately every 1 to 3 feet of the vertical dimension or the height of door frame assembly 200, and one or more trim assemblies can have spring covers of element 205 that are aligned with and snapped onto or otherwise mechanically attached to the multiple springs to attach the one or more trim assemblies to door frame assembly 200. The trim assemblies can cover portions of door frame assembly 200 and also can cover or not cover portions of the wall coverings. For door frame assembly 200, the springs can be attached to the outer portion of portions 201 and/or 203 at only or both sides of door frame assembly 200. Each spring can be approximately ¼ inch to 1 inch wide (or ⅜ inch to ½ inch wide) and can have one or more holes to receive the one or more mechanical fasteners to attach the spring to door frame assembly 200. The one or more mechanical fasteners used to attach the spring to the door frame assembly can be the same or different as the mechanical fasteners previously described to attach the door frame assembly to the wall. The door frame assembly of FIG. 1 also can have this embodiment and its variations.

In one variation of this embodiment, the spring covers are attached to the door frame assembly, and the springs are attached to the trim assembly. In another variation of this embodiment, when the wall coverings (not shown in FIG. 2) are inserted into the U-shaped portions (i.e., portions 203) of the door frame assembly, the springs (or spring covers) can be attached to the door frame assembly by securing the mechanical fasteners through the door frame assembly and the wall coverings.

Figure 3B:
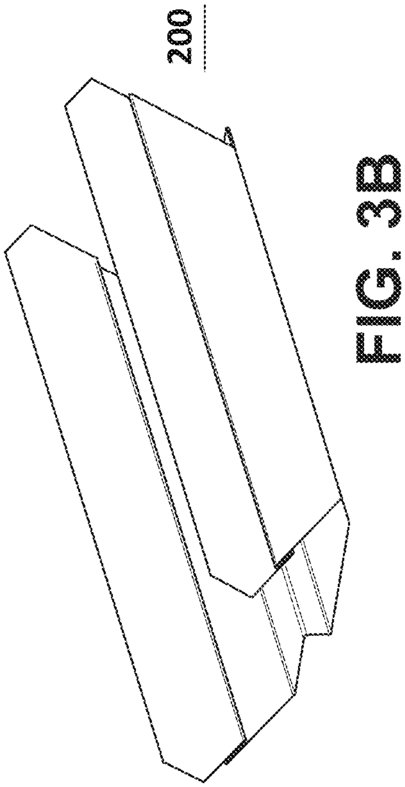
FIGS. 3A, 3B, and 3C illustrate additional details of the door frame assembly of FIG. 2.
Figure 3A:
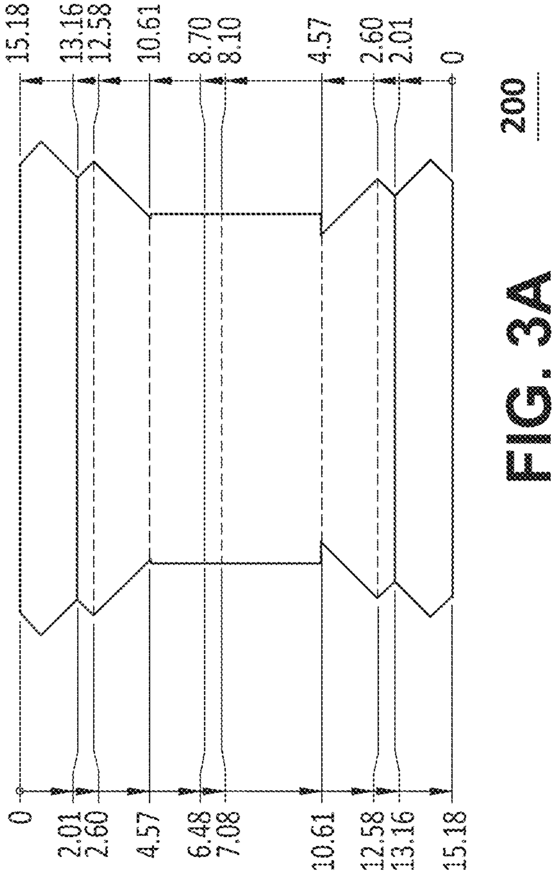
Figure 3C:
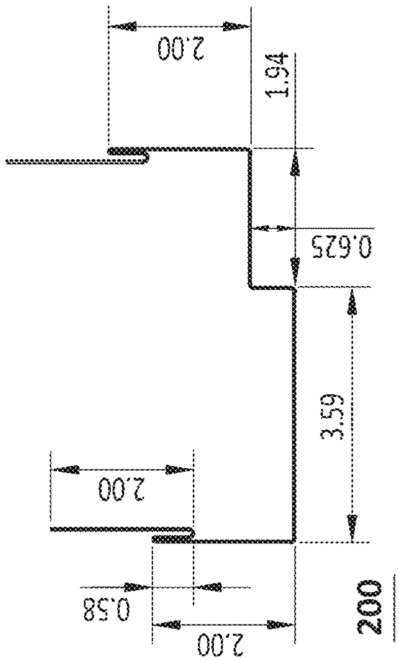

Moving ahead in the drawings, FIGS. 3A, 3B, and 3C illustrate additional details of the door frame assembly of FIG. 2. For example, a single, flat piece of material can be cut to an appropriate shape and folded or bent in a particular manner to create the door frame assembly in this embodiment. The dimensions shown in FIGS. 3A and 3C are exemplary, are shown in inches (and can be converted to centimeters by multiplying the numerical values in FIG. 3 by 2.54), and can vary depending on the requirements for the door frame assembly.

In FIG. 3A, the first or top horizontal line across the width of door frame assembly 200 is located at the 2.01 inch mark on left side of door frame assembly 200. This first horizontal line represents the location of a first bend in door frame assembly 200. This first bend can be a 180 degree “up” bend having a 0.05 inch radius.

The second-from-the-top horizontal line across the width of door frame assembly 200 is located at the 2.60 inch mark on the left side of door frame assembly 200. This second horizontal line represents the location of a second bend in door frame assembly 200. This second bend can be a 180 degree “down” bend having a 0 inch radius.

The third horizontal line across the width of door frame assembly 200 is located at the 4.57 inch mark on the left side of door frame assembly 200. This third horizontal line represents the location of a third bend in door frame assembly 200. This third bend can be a 90 degree “down” bend having a 0.04 inch radius.

The fourth horizontal line across the width of door frame assembly 200 is located at the 6.48 inch mark on the left side of door frame assembly 200. This fourth horizontal line represents the location of a fourth bend in door frame assembly 200. This fourth bend can be a 90 degree “up” bend having a 0.04 inch radius.

The fifth horizontal line across the width of door frame assembly 200 is located at the 7.08 inch mark on the left side of door frame assembly 200. This fifth horizontal line represents the location of a fifth bend in door frame assembly 200. This fifth bend can be a 90 degree “down” bend having a 0.04 inch radius.

The sixth horizontal line across the width of door frame assembly 200 is located at the 10.61 inch mark on the left side of door frame assembly 200. This sixth horizontal line represents the location of a sixth bend in door frame assembly 200. This sixth bend can be a 90 degree “down” bend having a 0.04 inch radius.

The seventh horizontal line across the width of door frame assembly 200 is located at the 12.58 inch mark on the left side of door frame assembly 200. This seventh horizontal line represents the location of a seventh bend in door frame assembly 200. This seventh bend can be a 180 degree “down” bend having a 0 inch radius.

The eighth or bottom-most horizontal line across the width of door frame assembly 200 is located at the 13.16 inch mark on the left side of door frame assembly 200. This eighth horizontal line represents the location of an eighth bend in door frame assembly 200. This eighth bend can be a 180 degree "up" bend having a 0.05 inch radius.

As one skilled in the art would understand from FIGS. 2 and 3A-3C, three door frame assemblies can be used for a single door—a first door frame assembly on the left side of the door, a second door frame assembly on the right side of the door, and a third door frame assembly at the top of the door. In this embodiment, the door frame assembly illustrated in FIGS. 2 and 3A-3C can be the first door frame assembly on the left side of the door. The first and second door frame assemblies can be mirror images of each other, and the third door frame assembly can be similar to the first and second door frame assemblies. The first, second, and third door frame assemblies can have edges that are complementary to each other to allow the first and third door frame assemblies to interlock or otherwise fit together and to allow the second and third door frame assemblies to similarly interlock or otherwise fit together. The joints between the first, second, and third door frame assemblies can be optionally sealed by a sealant such as caulk or silicone. In another embodiment, this three-piece configuration can be manufactured using a casting, welding, hydro-forming, pressing, or injecting process to create a one-piece assembly. Furthermore, this three-piece configuration and the one-piece assembly also apply to the embodiment of the door frame assembly of FIG. 1, and the three-piece configuration and one-piece assembly also can be used in a double door embodiment.

Figure 4:
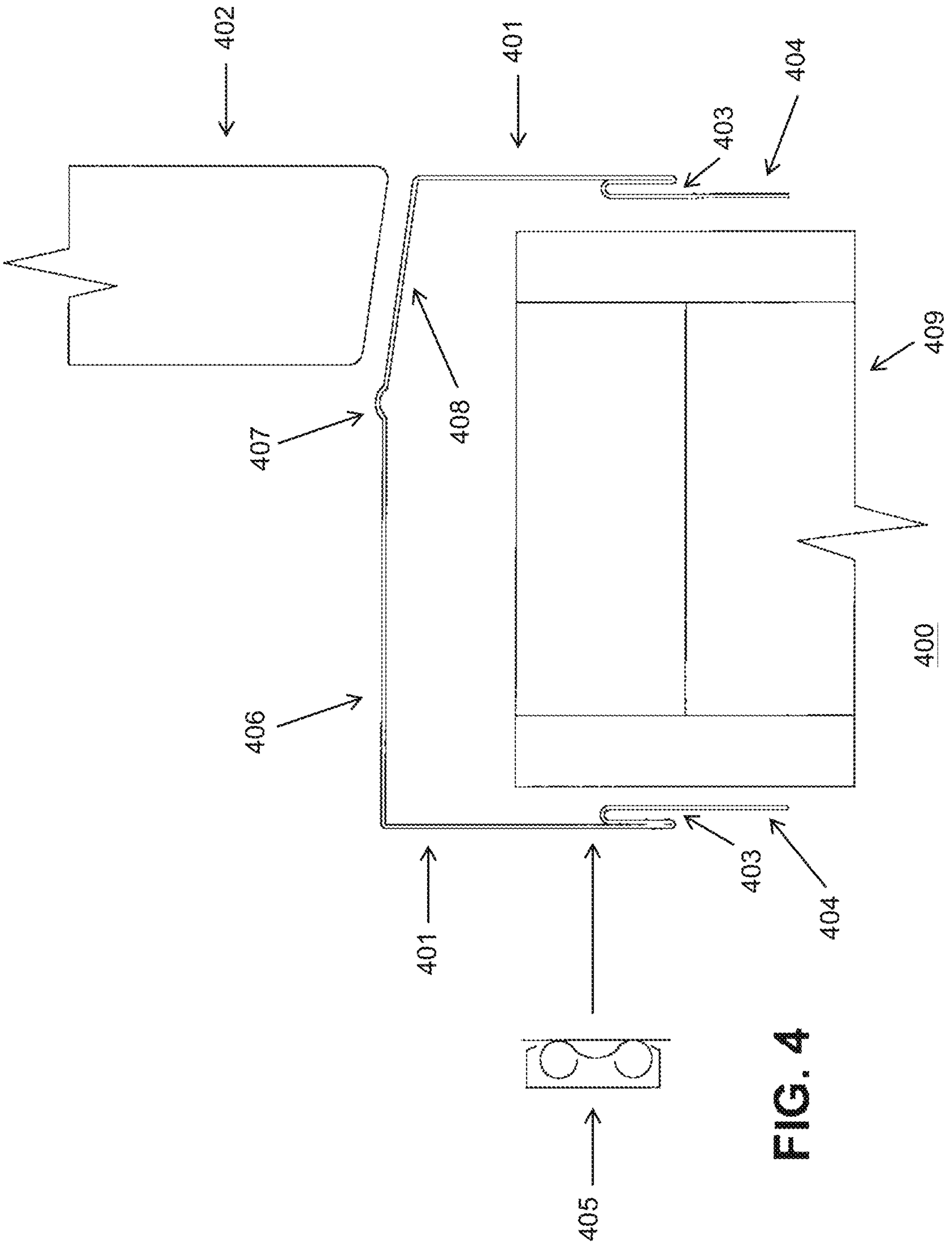
FIG. 4 illustrates an exploded view of an exemplary embodiment of a door frame assembly having a bevel profile.

Turning to the next drawing, FIG. 4 illustrates an exploded view of an exemplary embodiment of a door frame assembly 400 at an end of wall 409. The door frame assembly is shown in a top-down view. (The door frame assembly shown in FIG. 4 is too large for the wall shown in FIG. 4, and is drawn larger than desired in FIG. 4 to more easily explain the concepts presented herein.) Door frame assembly 400 has portions 401, portions 403, portions 404, raised portion 406, bump 407, and portion 408.

In many embodiments, the door frame assembly can be bent into shape from a single, integrated piece of material. In the same or different embodiments, the door frame assembly can be made of metal, such as 20 gauge 304 stainless steel. In other embodiments, the door frame assembly can be made of a different type of metal or other material that is malleable or pliable.

The door frame assembly of FIG. 4 can be similar to the door frame assemblies of FIGS. 1-3, such that the elements of FIG. 4 having reference numbers with the same last two digits as reference numbers in FIGS. 1-3 can represent similar elements in FIG. 1-3. However, door frame assembly 400 of FIG. 4 has a bevel profile where door 402 closes against portion 408 of door frame assembly 400 while the door frame assemblies of FIGS. 1-3 have a more traditional door stop profile. The bevel profile of door frame assembly 400 of FIG. 4 includes bump 407 and raised portion 406, as well as portion 408, that can assist in stopping or at least slowing down a closing door. The bevel profile, including bump 407 and portion 408 which are not flush with wall 409, can have a spring-like effect on the door if the door contacts the bevel profile when the door is closing.

The door frame assembly can replace the typical door trim that is often used around a door. For example, the door frame assembly of FIG. 4 can be inserted over an end of wall 409 and serve as a doorjamb. Portion 404 of door frame assembly 400 and can be attached to the wall with mechanical fasteners such as nails, rivets, and/or screws. The door frame assembly can have holes at portions 404 to receive the mechanical fasteners.

All or a portion of the door frame assembly can be flush with the end of the wall. For example, portions 404 can be flush with the end of wall 409, while raised portion 406 and the beveled portion (including portions 407-408) would not be flush with the end of the wall, as illustrated in FIG. 4. In another embodiment, all or some of the beveled portion is flush with the end of the wall. In any of these embodiments, portions 401 of door frame assembly 400 can be separated from and not flush with the end of wall 409.

Ends of wall coverings (not shown in FIG. 4) that cover wall 409 can be inserted into the upside-down U-shaped portions on the right and left sides of the door frame assembly, as indicated by portions 403 in FIG. 4. In many embodiments, the wall coverings can be made of composite materials such as fiber-reinforced plastic or fiber-reinforced polymer (FRP). In other embodiments, the wall coverings can be made of other materials.

In a different embodiment, springs and/or spring covers inside element 405 can be attached to door frame assembly 400 (and possibly the end of wall 409), similar to how springs and spring covers inside element 205 (FIG. 2) were described above to be attached to door frame assembly 200 (FIG. 2).

Similar to the embodiment of the door frame assemblies in FIGS. 1-3, the embodiment of the door frame assembly in FIG. 4 can use three door frame assemblies for a single door—a first door frame assembly on the left side of the door, a second door frame assembly on the right side of the door, and a third door frame assembly at the top of the door. In this embodiment, the door frame assembly illustrated in FIG. 4 can be the first door frame assembly on the left side of the door. The second and third door frame assemblies can be similar to the first door frame assembly, and can be more similar to each other in shape than to the first door frame assembly. The first, second, and third door frame assemblies can have edges that are complementary to each other to allow the first and third door frame assemblies to interlock or otherwise fit together and to allow the second and third door frame assemblies to similarly interlock or otherwise fit together. The joints between the first, second, and third door frame assemblies can be optionally sealed by a sealant such as caulk or silicone. In another embodiment, this three-piece configuration can be manufactured using a casting, welding, hydro-forming, pressing, or injecting process to create a one-piece assembly. Furthermore, in another embodiment, the three door frame assemblies and one-piece assemblies can be used in a double door configuration.

Figure 5:
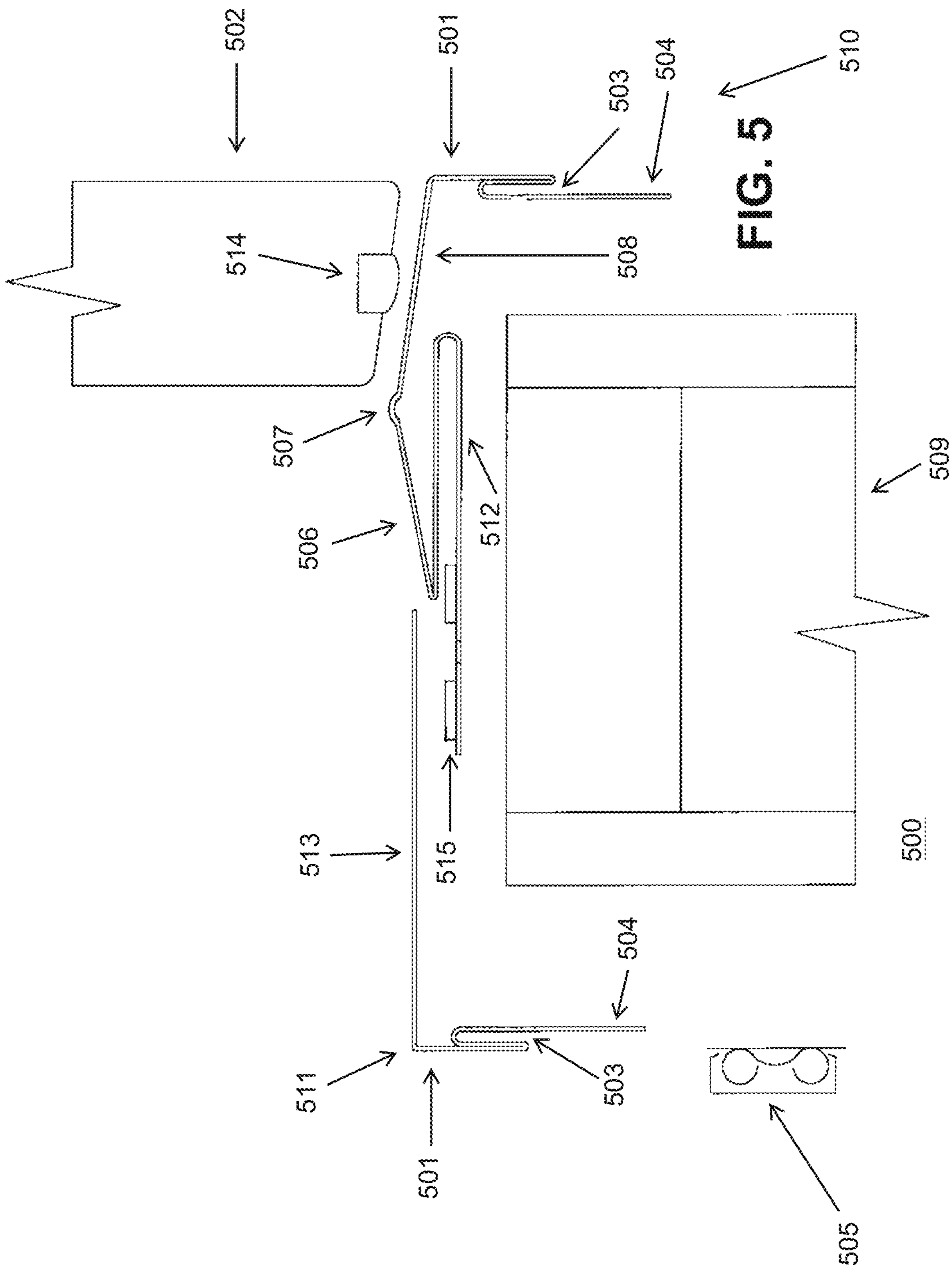
FIG. 5 illustrates an exploded view of an exemplary embodiment of a door frame assembly that is adjustable and that has a bevel profile.

In the next drawing, FIG. 5 illustrates an exploded view of an exemplary embodiment of a door frame assembly 500 that is adjustable at an end of wall 509 and that has a bevel profile. The door frame assembly is shown in a top-down view.

In many embodiments, the door frame assembly can be a multi-piece assembly, where each piece is bent into its respective shape. More specifically, door frame assembly 500 can be a two-piece assembly with portions 510 and 511. Portion 510 can be the fixed side and the strike side where door 502 strikes door frame assembly 500 when closing, and portion 511 can be the adjustable side. Each of portions 510 and 511 have portions 501, 503, and 504. Portion 510 also has raised portion 506, bump 507, and portion 508, as well as groove 512. Portion 511 has portion 513 for insertion into groove 512.

Each of portions 510 and 511 can be bent into shape from a single, integrated piece of material. In the same or different embodiments, each of portions 510 and 511 can be made of metal, such as 20 gauge 304 stainless steel. In other embodiments, each of portions 510 and 511 can be made of a different type of metal or other material that is malleable or pliable.

The door frame assembly of FIG. 5 can be similar to the door frame assemblies of FIGS. 1-4, such that the elements of FIG. 5 having reference numbers with the same last two digits as reference numbers in FIGS. 1-4 can represent similar elements in FIGS. 1-4. Both door frame assemblies in FIGS. 4 and 5 have a bevel profile where the door closes against a portion (portion 508 in FIG. 5) of the door frame assembly, and also have a bump (bump 507 in FIG. 5) and raised portion (portion 506 in FIG. 5) next to the bevel profile that can assist in stopping or at least slowing down the door (door 502 in FIG. 5) that is closing. In FIG. 5, the bevel profile, including bump 507 and portion 508 which are not flush with wall 509, can have a spring-like effect on door 502 and/or gasket 514 of door 502 if door 502 and/or gasket 514 contacts the bevel profile when door 502 is closing.

The door frame assembly can replace the typical door trim that is often used around a door. For example, the door frame assembly of FIG. 5 can be inserted over an end of wall 509 and serve as a doorjamb. Portions 504 of door frame assembly 400 can be attached to the wall with mechanical fasteners such as nails, rivets, and/or screws. The door frame assembly can have holes at portions 504 to receive the mechanical fasteners.

Figure 6:
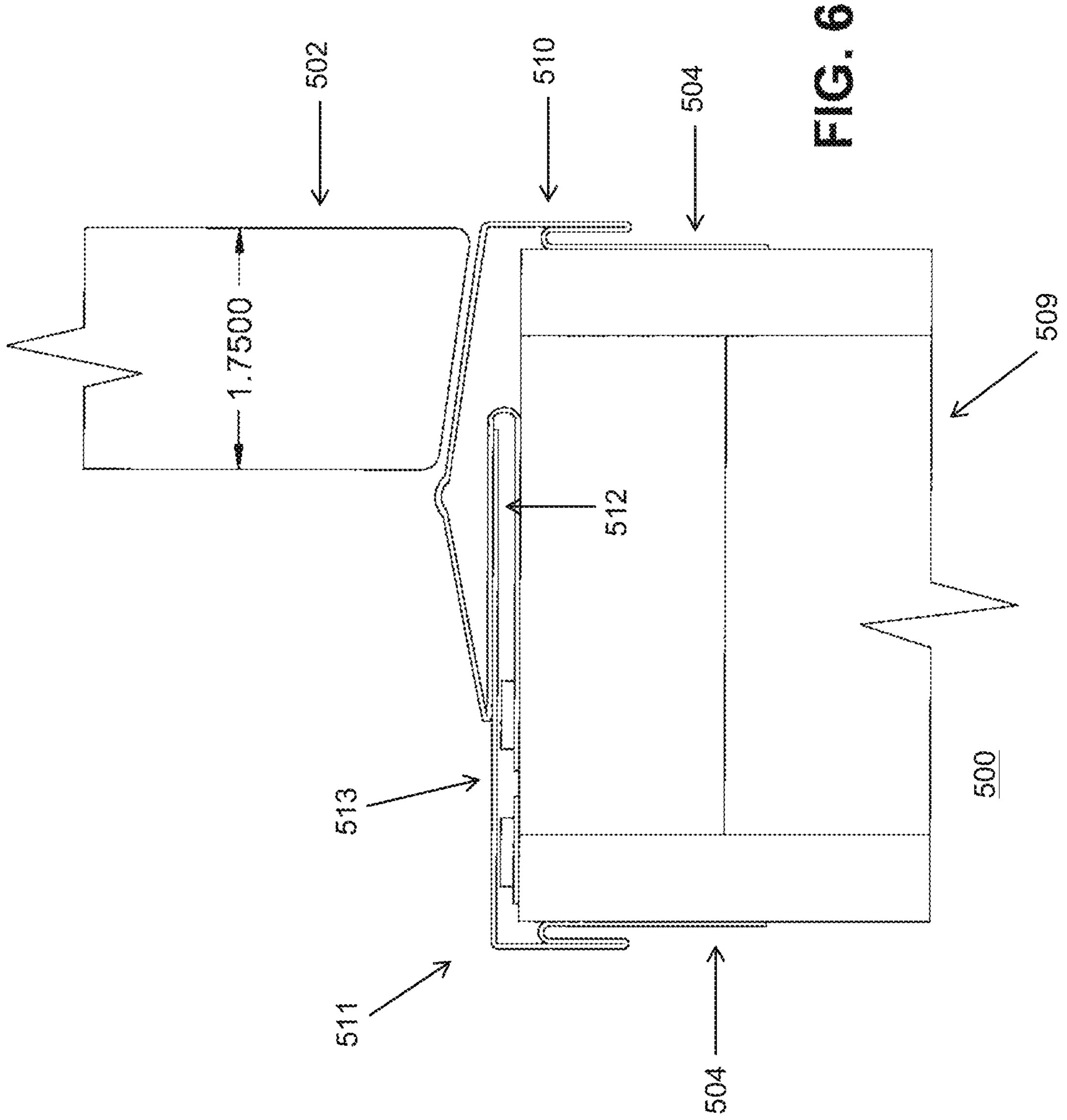
FIG. 6 illustrates an assembled view of the door frame assembly of FIG. 5.

All or a portion of the door frame assembly can be flush with the end of the wall. FIG. 6 illustrates an assembled view of door frame 500 around the end of wall 509, but the door, which has a width of approximately 1.75 inches in this embodiment, in FIG. 6 does not have a door seal or gasket, unlike door 502 in FIG. 5. FIG. 6 shows portions 504 of portions 510 and 511 of the door frame assembly flush with the end of the wall, and also shows part of portion 511 that forms groove 512 being flush with the end of the wall. FIG. 6 shows portions 501 of portions 510 and 511 not being flush with the end of the wall. FIG. 6 also shows portion 513 inserted into groove 512.

Returning to FIG. 5, ends of wall coverings (not shown in FIG. 5) that cover wall 509 can be inserted into the upside-down U-shaped portions on the right and left sides of the door frame assembly, as indicated by portions 503 in FIG. 5. In many embodiments, the wall coverings can be made of composite materials such as fiber-reinforced plastic or fiber-reinforced polymer (FRP). In other embodiments, the wall coverings can be made of other materials.

In a different embodiment, springs and/or spring covers inside element 505 can be attached to door frame assembly 500 (and possibly the end of wall 509), similar to how springs and spring covers inside element 205 (FIG. 2) were described above to be attached to door frame assembly 200 (FIG. 2).

The portions 510 and 511 of the door frame assembly of FIG. 5 make the door frame assembly adjustable to fit different sized walls or doorjambs with different widths. FIG. 5 shows the door frame assembly as having gasket 515 that can be used at a joint between portions 510 and 511 of door frame assembly 500. In some embodiments, gasket 515 can be made of neoprene. In other embodiments, gasket 515 can be made of a different material that is elastic and/or can be compressed. In the same or different embodiments, the joint between portions 510 and 511 of the door frame assembly can be sealed with a material such as caulk or silicone.

Similar to the embodiment of the door frame assemblies in FIGS. 1-4, the embodiment of the door frame assembly in FIGS. 5-6 can use three door frame assemblies for a single door—a first door frame assembly on the left side of the door, a second door frame assembly on the right side of the door, and a third door frame assembly at the top of the door. In this embodiment, the door frame assembly illustrated in FIGS. 5-6 can be the first door frame assembly on the left side of the door. The second and third door frame assemblies can be similar to the first door frame assembly, and can be more similar to each other in shape than to the first door frame assembly. The first, second, and third door frame assemblies can have edges that are complementary to each other to allow the first and third door frame assemblies to interlock or otherwise fit together and to allow the second and third door frame assemblies to similarly interlock or otherwise fit together. In another embodiment, this three-piece configuration can be manufactured using a casting, welding, hydro-forming, pressing, or injecting process to create a one-piece assembly. Furthermore, in another embodiment, the three door frame assemblies and one-piece assemblies can be used in a double door configuration.

In assembling the door frame assemblies, portion 510 of the door frame assembly can be first attached to the wall, along with the corresponding pieces of the two or three other door frame assemblies on the same side of door 502 (FIG. 5). (Two corresponding pieces can be used when the door frame assembly is not installed on the floor or on the threshold of the door, and three corresponding pieces can be used when the door frame assembly is installed on the floor.) Next, portion 511 of the door frame assembly can be attached to the wall on the other side of door 502 (FIG. 5), along with the corresponding pieces of the two or three other door frame assemblies on the other side of door 502 (FIG. 5). Then, an optional sealant can be applied to the joints between portions 510 and 511 and the other paired portions of the two or three other door frame assemblies around door 502 (FIG. 5). Subsequently, optional springs or spring covers can be attached to portions 510 and/or 511 and the other paired portions of the two or three other door frame assemblies, and optionally the wall, as well, and then optional trim assemblies can be attached to the optional springs or spring covers.

Figure 7:
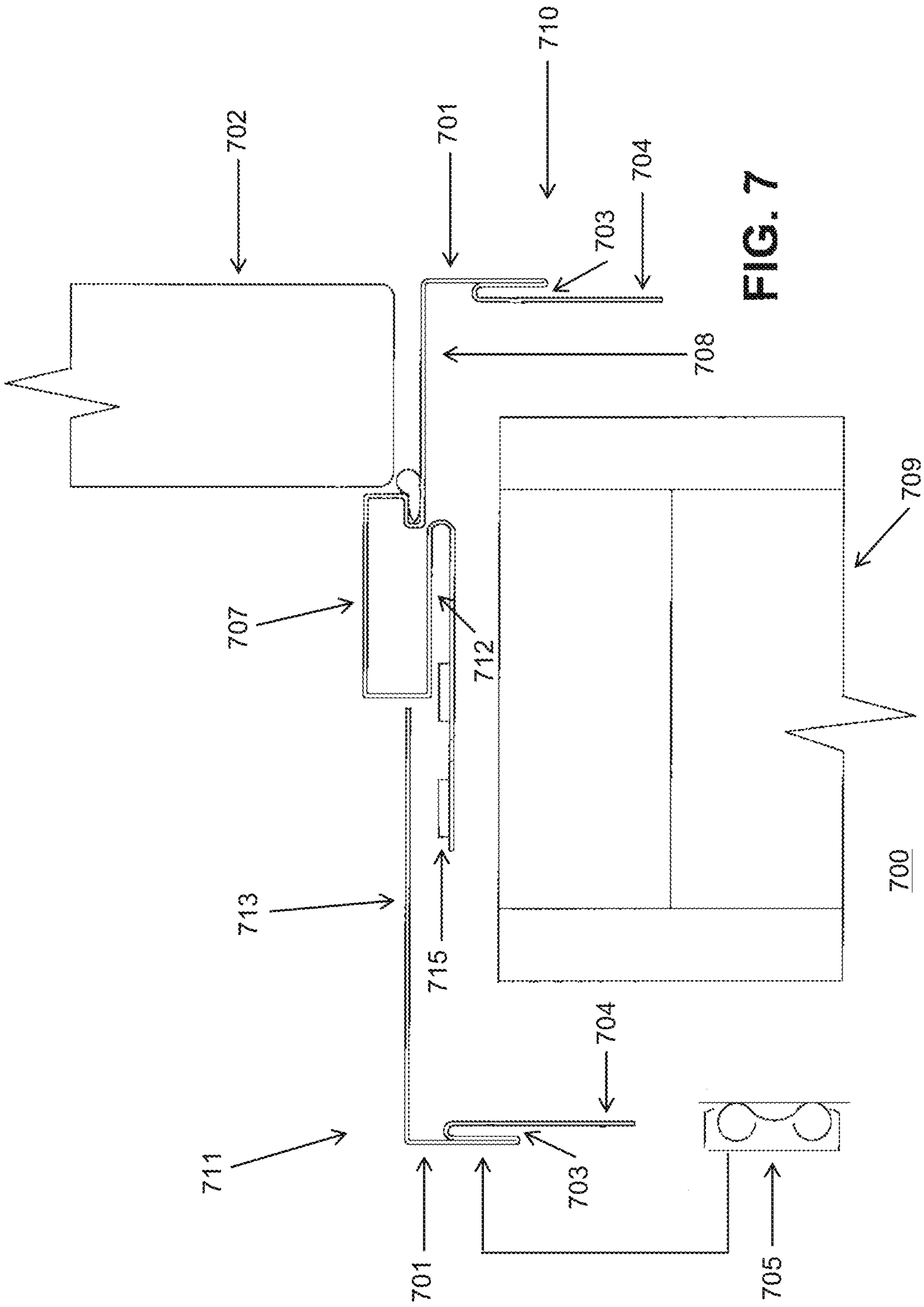
FIG. 7 illustrates an exploded view of an exemplary embodiment of a door frame assembly that is adjustable.

Jumping ahead in the drawings, FIG. 7 illustrates an exploded view of an exemplary embodiment of a door frame assembly 700 that is adjustable at an end of wall 709. The door frame assembly is shown in a top-down view.

In many embodiments, the door frame assembly can be a multi-piece assembly, where each piece is bent into its respective shape. More specifically, door frame assembly 700 can be a two-piece assembly with portions 710 and 711. Portion 710 can be the fixed side and the strike side where door 702 strikes door frame assembly 700 when closing, and portion 711 can be the adjustable side. Each of portions 710 and 711 have portions 701, 703, and 704. Portion 710 also has bump 707 and portion 708, as well as groove 712. Portion 711 has portion 713 for insertion into groove 712.

Each of portions 710 and 711 can be bent into shape from a single, integrated piece of material. In the same or different embodiments, each of portions 710 and 711 can be made of metal, such as 20 gauge 304 stainless steel. In other embodiments, portions 710 and 711 can be made of a different type of metal or other material that is malleable or pliable.

The door frame assembly of FIG. 7 can be similar to the door frame assemblies of FIGS. 1-6, such that the elements of FIG. 7 having reference numbers with the same last two digits as reference numbers in FIGS. 1-6 can represent similar elements in FIGS. 1-6. Both door frame assemblies in FIGS. 5-6 and in FIG. 7 are adjustable to fit different sized walls or doorjambs with different widths.

The door frame assembly can replace the typical door trim that is often used around a door. The door frame assembly of FIG. 7 can be inserted over an end of wall 709 as a doorjamb. Portions 704 of door frame assembly 700 can be attached to the wall with mechanical fasteners such as nails, rivets, and/or screws. The door frame assembly can have holes at portions 704 to receive the mechanical fasteners.

All or a portion of the door frame assembly can be flush with the end of the wall. When door frame assembly 700 is fully assembled, portions 704 of portions 710 and 711 can be flush with the end of wall 709, and a part of portion 711 that forms groove 712 also can be flush with the end of wall 709. In one embodiment, portions 701 are not flush with the end of wall 709. Bump 707 is not flush with the end of wall 709 so that bump 707 can have a spring-like effect on door 702 if door 702 contacts bump 707 when door 702 is closing.

Ends of wall coverings (not shown in FIG. 5) that cover wall 709 can be inserted into the upside-down U-shaped portions on the right and left sides of the door frame assembly, as indicated by portions 703 in FIG. 7. In many embodiments, the wall coverings can be made of composite materials such as fiber-reinforced plastic or fiber-reinforced polymer (FRP). In other embodiments, the wall coverings can be made of other materials.

In a different embodiment, springs and/or spring covers inside element 705 can be attached to door frame assembly 700 (and possibly the end of wall 709), similar to how springs and spring covers inside element 205 (FIG. 2) were described above to be attached to door frame assembly 200 (FIG. 2).

As noted above, portions 710 and 711 of the door frame assembly of FIG. 7 make the door frame assembly adjustable to fit different sized walls or doorjambs with different widths. FIG. 7 shows the door frame assembly as having a gasket 715 that can be used at a joint between portions 710 and 711 of door frame assembly 700. In some embodiments, gasket 715 can be made of neoprene. In other embodiments, gasket 715 can be made of a different material that is elastic and/or can be compressed. In the same or different embodiments, the joint between portions 710 and 711 of the door frame assembly can be sealed with a material such as caulk or silicone.

Similar to the embodiment of the door frame assemblies in FIGS. 1-6, the embodiment of the door frame assembly in FIG. 7 can use three door frame assemblies for a single door—a first door frame assembly on the left side of the door, a second door frame assembly on the right side of the door, and a third door frame assembly at the top of the door. In this embodiment, the door frame assembly illustrated in FIG. 7 can be the first door frame assembly on the left side of the door. The second and third door frame assemblies can be similar to the first door frame assembly, and can be more similar to each other in shape than to the first door frame assembly. The first, second, and third door frame assemblies can have edges that are complementary to each other to allow the first and third door frame assemblies to interlock or otherwise fit together and to allow the second and third door frame assemblies to similarly interlock or otherwise fit together. In another embodiment, this three-piece configuration can be manufactured using a casting, welding, hydro-forming, pressing, or injecting process to create a one-piece assembly. Furthermore, in another embodiment, the three door frame assemblies and one-piece assemblies can be used in a double door configuration.

In assembling the door frame assemblies, portions 710 and 711 can be assembled in a manner similar to what was described above for the assembly of portions 510 (FIG. 5) and 511 (FIG. 5).

Figure 8:
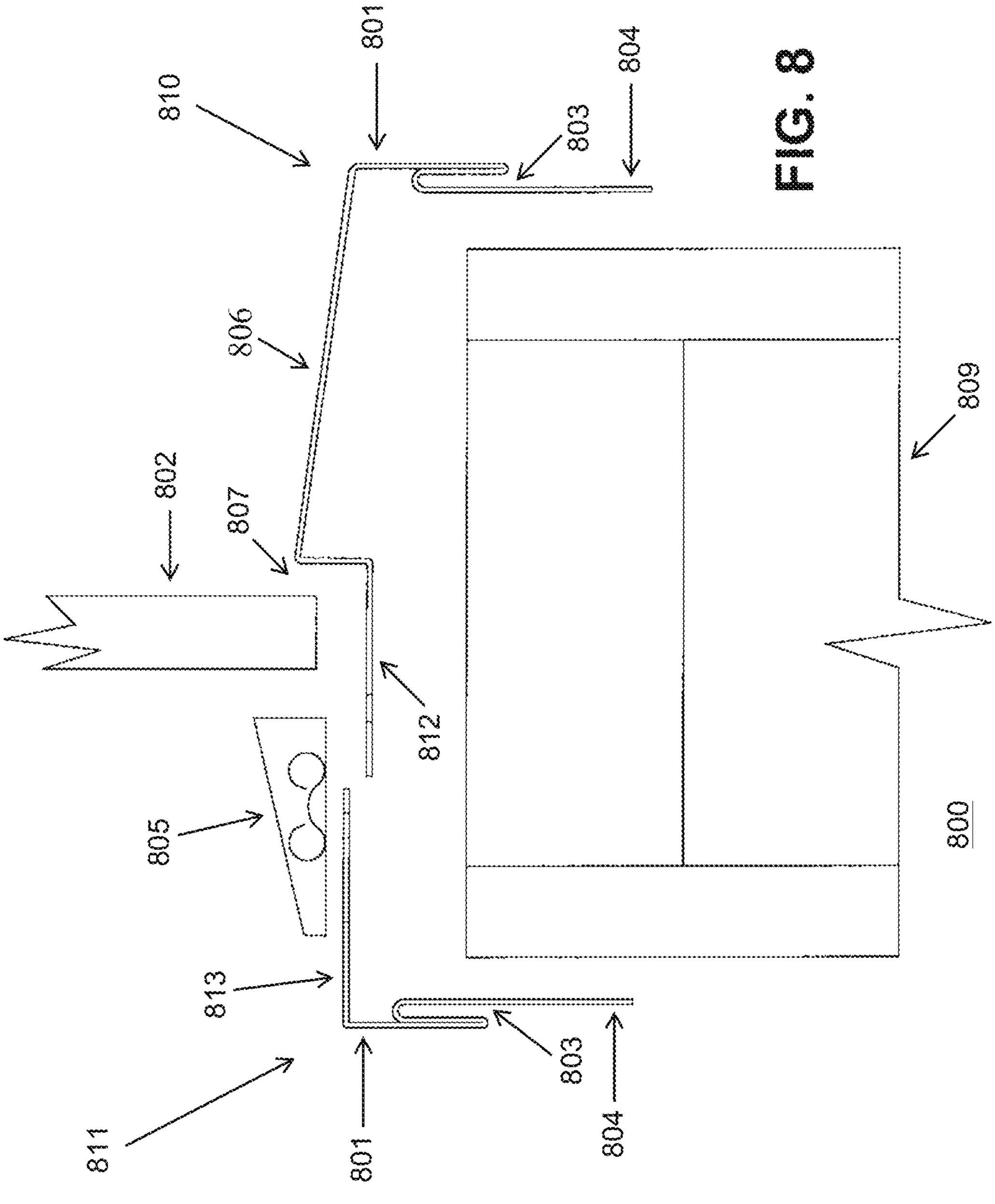
FIG. 8 illustrates an exploded view of an exemplary embodiment of a single-paned window frame assembly that is adjustable and that has a bevel profile.

Continuing with the next drawing, FIG. 8 illustrates an exploded view of an exemplary embodiment of a single-paned window frame assembly 800 that is adjustable at an end of wall 809 and that has a bevel profile. The window frame assembly is shown in a top-down view.

In many embodiments, the window frame assembly can be a multi-piece assembly, where each piece is bent into its respective shape. More specifically, window frame assembly 800 can be a two-piece assembly with portions 810 and 811. Portion 810 can be the fixed side, and portion 811 can be the adjustable side. Each of portions 810 and 811 have portions 801, 803, and 804. Portion 810 also has raised portion 806 and bump 807, as well as region 812. Portion 811 has portion 813 for insertion adjacent to region 812.

Each of portions 810 and 811 can be bent into shape from a single, integrated piece of material. In the same or different embodiments, each of portions 810 and 811 can be made of metal, such as 20 gauge 304 stainless steel. In other embodiments, each of portions 810 and 811 can be made of a different type of metal or other material that is malleable or pliable.

Portions of the window frame assembly of FIG. 8 can be similar to the door frame assemblies of FIGS. 1-7 such that elements of FIG. 8 having reference numbers with the same last two digits as reference numbers in FIGS. 1-7 can represent similar elements in FIGS. 1-7. Both door frame assemblies in FIGS. 5-7 and window frame assembly in FIG. 8 are adjustable to fit different sized walls with different widths.

The window frame assembly can replace the typical window trim that is often used around a window. For example, the window frame assembly of FIG. 8 can be inserted over an end of wall 809 and serve as a window frame. Portions 804 of window frame assembly 800 can be attached to the wall with mechanical fasteners such as nails, rivets, and/or screws. The window frame assembly can have holes at portions 804 to receive the mechanical fasteners.

All or a portion of the window frame assembly can be flush with the end of the wall. For example, when window frame assembly 800 is fully assembled at the end of wall 809, portions 804 and region 812 can be flush with the end of wall 809, and portions 801 can be spaced away from the end of wall 809. The beveled portion (i.e., raised portion 806 and bump 807) of portion 810 of the window frame assembly can be another portion of the window frame assembly that is not flush with the end of the wall to create a spring-like effect for securing window pane 802 to window frame assembly 800. Also when fully assembled, portion 813 is adjacent to, overlaps, or is located within region 812. Although not illustrated as such in FIG. 8, region 812 can be a groove, similar to groove 712 (FIG. 7), and region (or groove) 812 can have a gasket similar to gasket 715 (FIG. 7) in groove 712 (FIG. 7).

Ends of wall coverings (not shown in FIG. 8) that cover the wall can be inserted into the upside-down U-shaped portions on the right and left sides of the window frame assembly, as indicated by portions 803 in FIG. 8. In many embodiments, the wall coverings can be made of composite materials such as fiber-reinforced plastic or fiber-reinforced polymer (FRP). In other embodiments, the wall coverings can be made of other materials.

Although not shown in FIG. 8, springs and/or spring covers can be attached to portions 801 and/or 803 of window frame assembly 800 (and possibly the end of wall 809), similar to how springs and spring covers inside element 205 (FIG. 2) were described above to be attached to door frame assembly 200 (FIG. 2).

As noted above, portions 810 and 811 of the window frame assembly of FIG. 8 make the window frame assembly adjustable to fit different sized walls or window frames with different widths. Although not shown in FIG. 8, window frame assembly 800 can have a gasket at a joint between portions 810 and 811, similar to the gaskets described above for the door frame assemblies in FIGS. 5-7. In some embodiments, the gasket can be made of neoprene. In other embodiments, the gasket can be made of a different material that is elastic and/or can be compressed. In some embodiments, the joint between portions 810 and 811 of the window frame assembly can be sealed with a material such as caulk or silicone.

The embodiment of the window frame assembly in FIG. 8 can use four window frame assemblies for a single window—a first window frame assembly on the left side of the window, a second window frame assembly on the right side of the window, a third window frame assembly at the top of the window, and a fourth window frame assembly at the bottom of the window. In this embodiment, the window can be square, rectangular, diamond, or another shape with four sides. In other embodiments, the window can have other shapes, and different numbers of window frame assemblies can be used accordingly. In one embodiment, the window frame assembly illustrated in FIG. 8 can be the same as each of the first, second, third, and fourth window frame assemblies when the window has a square shape. The first, second, third, and fourth window frame assemblies can have edges that are complementary to each other to allow the first and third window frame assemblies to interlock or otherwise fit together, to allow the first and fourth window frame assemblies to interlock or otherwise fit together, to allow the second and third window frame assemblies to similarly interlock or otherwise fit together, and to allow the second and fourth window frame assemblies to similarly interlock or otherwise fit together. In another embodiment, this four-piece configuration can be manufactured using a casting, welding, hydro-forming, pressing, or injecting process to create a one-piece assembly.

In assembling the window frame assemblies, four of portion 810, one on each of the four sides of the window and all on the same side of the wall, can be attached to the wall. Next, four of portion 811, one on each of the four sides of the window and all on an opposite side of the wall, can be attached to the wall. Then, an optional sealant can be applied to the joints between the four pairs of portions 810 and 811. Subsequently, glass or window pane 802 can be attached to the four window frame assemblies by using a sealant such as caulk or silicone. The sealant used to attach window pane 802 to the window frame assemblies can be the same or different as the sealant used to seal the joint between portions 810 and 811 of the window frame assemblies. Next, springs of glass stop 805 can be attached to the four window frame assemblies and possibly the wall, as well, and then coverings of glass stop 805 can be attached to the springs. The coverings abut against glass or window pane 802 to further secure the window pane between the coverings and bump 807.

The one or more springs of glass stops 805 can be attached to the window frame assemblies (and possibly the wall) using one or more mechanical fasteners such as one or more nails, rivets, and/or screws. In this different embodiment, if the window is large enough, there can be multiple springs attached to the window frame assemblies in a straight line approximately every 1 to 3 feet of the window frame assemblies, and the coverings of glass stops 805 can be snapped onto or otherwise mechanically attached to the springs. Each spring can be approximately ¼ inch to 1 inch wide (or ⅜ inch to ½ inch wide) and can have one or more holes to receive the one or more mechanical fasteners. The one or more mechanical fasteners used to attach the spring to the window frame assembly can be the same or different as the mechanical fasteners used to attached the window frame assembly to the wall.

Figure 9:
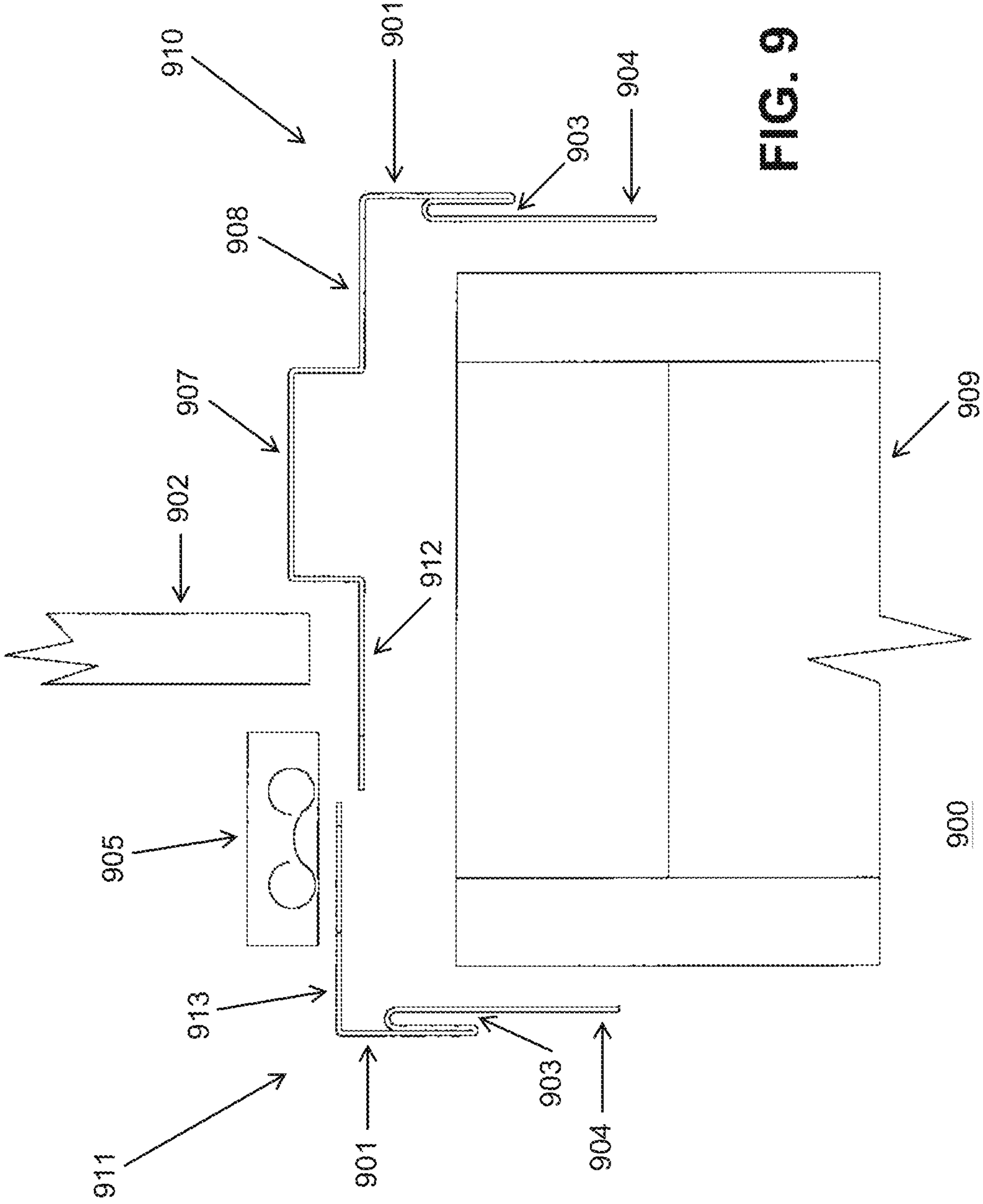
FIG. 9 illustrates an exploded view of an exemplary embodiment of a single-paned window frame assembly that is adjustable.

Moving ahead to the next drawing, FIG. 9 illustrates an exploded view of an exemplary embodiment of a single-paned window frame assembly 900 that is adjustable at an end of wall 909. The window frame assembly is shown in a top-down view.

In many embodiments, the window frame assembly can be a multi-piece assembly, where each piece is bent into its respective shape. More specifically, window frame assembly 900 can be a two-piece assembly with portions 910 and 911. Portion 910 can be the fixed side, and portion 911 can be the adjustable side. Each of portions 910 and 911 have portions 901, 903, and 904. Portion 910 also has bump 907 and portion 908, as well as region 912. Portion 911 has portion 913 for insertion adjacent to region 912.

Each of portions 910 and 911 can be bent into shape from a single, integrated piece of material. In the same or different embodiments, each of portions 910 and 911 can be made metal, such as of 20 gauge 304 stainless steel. In other embodiments, each of portions 910 and 911 can be made of a different type of metal or other material that is malleable or pliable.

The window frame assembly of FIG. 9 can be similar to the window frame assembly of FIG. 8 such that elements of FIG. 9 having reference numbers with the same last two digits as reference numbers in FIG. 8 can represent similar elements in FIG. 8. Both door frame assemblies in FIG. 8 and in FIG. 9 are adjustable to fit different sized walls or window frames with different widths.

The window frame assembly can replace the typical window trim that is often used around a window. For example, the window frame assembly of FIG. 9 can be inserted over an end of wall 909 to serve as a window frame. Portions 904 of window frame assembly 900 can be attached to the wall with mechanical fasteners such as nails, rivets, and/or screws. The window frame assembly can have holes at portions 904 to receive the mechanical fasteners. All or a portion of the window frame assembly can be flush with the end of the wall.

All or a portion of the window frame assembly can be flush with the end of the wall. For example, when window frame assembly 900 is fully assembled at the end of wall 909, portions 904 and region 912 can be flush with the end of wall 909, and portions 901 can be spaced away from the end of wall 809. Bump 907 of portion 910 of the window frame assembly can be another portion of the window frame assembly that is not flush with the end of the wall to create a spring-like effect for securing window pane 902 to window frame assembly 900. Also when fully assembled, portion 913 is adjacent to, overlaps, or is located within region 912. Although not illustrated as such in FIG. 9, region 912 can be a groove, similar to groove 712 (FIG. 7), and region (or groove) 912 can have a gasket similar to gasket 715 (FIG. 7) in groove 712 (FIG. 7).

Ends of wall coverings that cover the wall can be inserted into the upside-down U-shaped portions on the right and left sides of the window frame assembly, as indicated by portions 903 in FIG. 9. In many embodiments, the wall coverings can be made of composite materials such as fiber-reinforced plastic or fiber-reinforced polymer (FRP). In other embodiments, the wall coverings can be made of other materials.

Although not shown in FIG. 9, springs and/or spring covers can be attached to portions 901 and/or 903 of window frame assembly 900 (and possibly the end of wall 909), similar to how springs and spring covers inside element 205 (FIG. 2) were described above to be attached to door frame assembly 200 (FIG. 2).

As noted above, portions 910 and 911 of the window frame assembly of FIG. 9 make the window frame assembly adjustable to fit different sized walls or window frames with different widths. Although not shown in FIG. 9, window frame assembly 900 can have a gasket at a joint between portions 910 and 911, similar to the gaskets described above for the door frame assemblies in FIGS. 5-7. In some embodiments, the gasket can be made of neoprene. In other embodiments, the gasket can be made of a different material that is elastic and/or can be compressed. In some embodiments, the joint between portions 910 and 911 of the window frame assembly can be sealed with a material such as caulk or silicone.

The embodiment of the window frame assembly in FIG. 9 can use four window frame assemblies for a single window—a first window frame assembly on the left side of the window, a second window frame assembly on the right side of the window, a third window frame assembly at the top of the window, and a fourth window frame assembly at the bottom of the window. In this embodiment, the window can be square, rectangular, diamond, or another shape with four sides. In other embodiments, the window can have other shapes, and different numbers of window frame assemblies can be used accordingly. In one embodiment, the window frame assembly illustrated in FIG. 9 can be the same as each of the first, second, third, and fourth window frame assemblies when the window has a square shape. The first, second, third, and fourth window frame assemblies can have edges that are complementary to each other to allow the first and third window frame assemblies to interlock or otherwise fit together, to allow the first and fourth window frame assemblies to interlock or otherwise fit together, to allow the second and third window frame assemblies to similarly interlock or otherwise fit together, and to allow the second and fourth window frame assemblies to similarly interlock or otherwise fit together. In another embodiment, this four-piece configuration can be manufactured using a casting, welding, hydro-forming, pressing, or injecting process to create a one-piece assembly.

In assembling the window frame assemblies, four of portions 910 and 911 can be assembled in a manner similar to what was described above for the assembly of portions 810 (FIG. 8) and 811 (FIG. 8).

The one or more springs of glass stops 905 can be attached to the window frame assemblies (and possibly the wall) in a manner similar to what was described above for the attachment of the one or more springs of glass stops 805 (FIG. 8).

Figure 10:
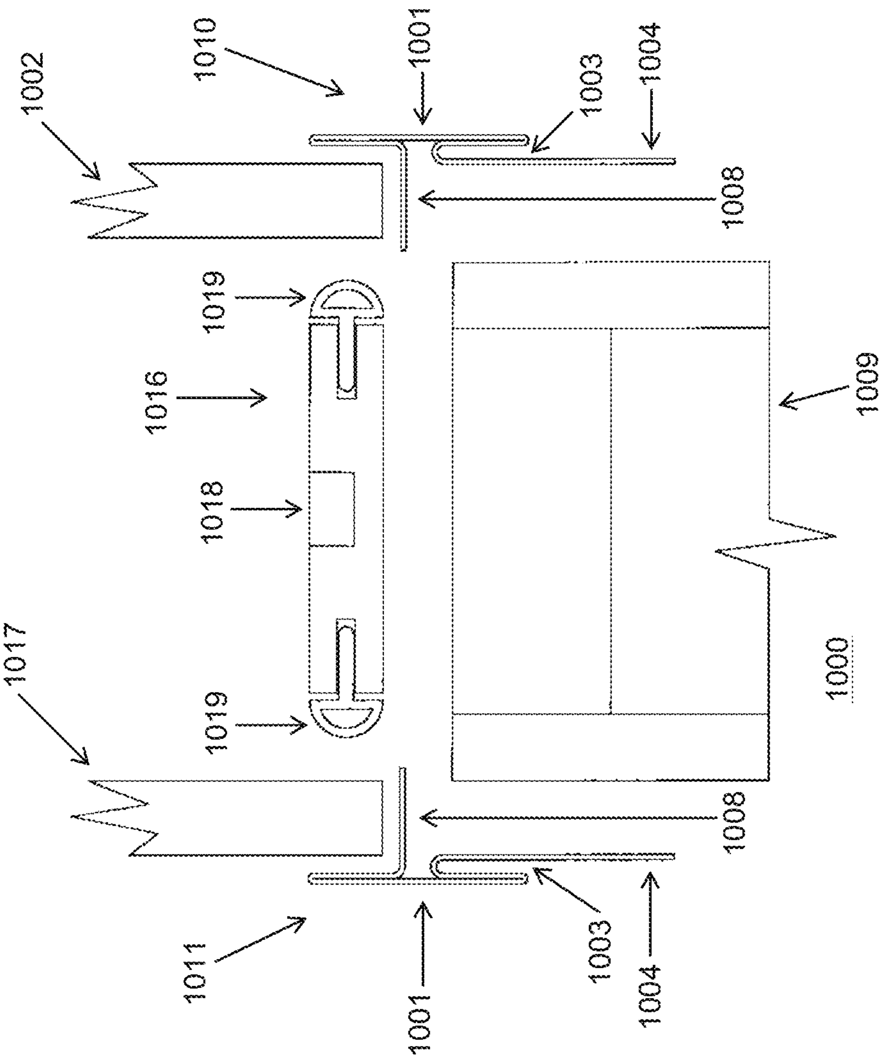
FIG. 10 illustrates an exploded view of an exemplary embodiment of a double-paned window frame assembly that is adjustable.

Turning to the next drawing, FIG. 10 illustrates an exploded view of an exemplary embodiment of a double-paned window frame assembly 1000 that is adjustable at an end of wall 1009. The window frame assembly is shown in a top-down view.

In many embodiments, the window frame assembly can be a multi-piece assembly, where each piece is bent into its respective shape. More specifically, window frame assembly 1000 can be a two-piece assembly with portions 1010 and 1011. Portions 1010 and 1011 can be identical to each other. Each of portions 1010 and 1011 have portions 1001, 1003, 1004, and 1008.

Each of portions 1010 and 1011 can be bent into shape from a single, integrated piece of material. In the same or different embodiments, each of portions 1010 and 1011 can be made of metal, such as 20 gauge 304 stainless steel. In other embodiments, each of portions 1010 and 1011 can be made of a different type of metal or other material that is malleable or pliable.

The window frame assembly of FIG. 10 can be similar to the window frame assemblies of FIGS. 8-9 such that elements of FIG. 10 having reference numbers with the same last two digits as reference numbers in FIGS. 8-9 can represent similar elements in FIGS. 8-9. Both window frame assemblies in FIG. 8-9 and in FIG. 10 are adjustable to fit different sized walls or window frames with different widths.

The window frame assembly can replace the typical window trim that is often used around a window. For example, the window frame assembly of FIG. 10 can be inserted over an end of wall 1009 to serve as a window frame. Portions 1004 of window frame assembly 1000 can be attached to the wall with mechanical fasteners such as nails, rivets, and/or screws. The window frame assembly can have holes at portions 1004 to receive the mechanical fasteners.

All or a portion of the window frame assembly can be flush with the end of the wall. For example, when window frame assembly 1000 is fully assembled at the end of wall 1009, portions 1004 and portion 1008 can be flush with the end of wall 1009, and portions 1001 can be spaced away from the end of wall 1009.

Ends of wall coverings (not shown in FIG. 10) that cover the wall can be inserted into the upside-down U-shaped portions on the right and left sides of the window frame assembly, as indicated by portions 1003 in FIG. 10. In many embodiments, the wall coverings can be made of composite materials such as fiber-reinforced plastic or fiber-reinforced polymer (FRP). In other embodiments, the wall coverings can be made of other materials.

Although not shown in FIG. 10, springs and/or spring covers can be attached to portions 1001 and/or 1003 of window frame assembly 1000 (and possibly the end of wall 1009), similar to how springs and spring covers inside element 205 (FIG. 2) were described above to be attached to door frame assembly 200 (FIG. 2).

As noted above, portions 1010 and 1011 of the window frame assembly of FIG. 10 make the window frame assembly adjustable to fit different sized walls or window frames with different widths.

The embodiment of the window frame assembly in FIG. 10 would use four window frame assemblies for a single window—a first window frame assembly on the left side of the window, a second window frame assembly on the right side of the window, a third window frame assembly at the top of the window, and a fourth window frame assembly at the bottom of the window. In this embodiment, the window can be square, rectangular, diamond, or another shape with four sides. In other embodiments, the window can have other shapes, and different numbers of window frame assemblies can be used accordingly. In one embodiment, the window frame assembly illustrated in FIG. 10 can be the same as each of the first, second, third, and fourth window frame assemblies when the window has a square shape. The first, second, third, and fourth window frame assemblies can have edges that are complementary to each other to allow the first and third window frame assemblies to interlock or otherwise fit together, to allow the first and fourth window frame assemblies to interlock or otherwise fit together, to allow the second and third window frame assemblies to similarly interlock or otherwise fit together, and to allow the second and fourth window frame assemblies to similarly interlock or otherwise fit together. In another embodiment, this four-piece configuration can be manufactured using a casting, welding, hydro-forming, pressing, or injecting process to create a one-piece assembly.

In assembling the window frame assemblies, four of portion 1010, one on each of the four sides of the window and all on a first side of the wall, can be attached to the wall. The joints between the four of portion 1010 can be optionally sealed by a sealant such as caulk or silicone. Next, a first one of the glass or window pane 1002 can be attached to the four of portion 1010 by using a sealant such as caulk or silicone. Then, four of interior seal 1016 can be inserted into the window box and contacting glass or window pane 1002. Subsequently, glass or window pane 1017 and four of portion 1011, one on each of the four sides of the window and all on a second, opposite side of the wall, can be attached to each other by using a sealant such as caulk or silicone, and also can be attached to the four of portion 1010, as well as to the wall. The joints between the respective adjacent four of portion 1010 and the joints between the respective adjacent four of portion 1011 also can be optionally sealed by a sealant such as caulk or silicone. The sealant used to attach glass or window pane 1002 to the four of portion 1010 and the sealant used to attached glass or window pane 1017 to the four of portion 1011 can be the same or different than the sealant used to seal the joints between the four of portion 1010 and the joints between the four of portion 1011.

Interior seal 1016 is located between glass or window panes 1002 and 1017. In some embodiments, interior seal 1016 can include a desiccant 1018 in a single, continuous seal around the perimeter of the window and exposed to the space between glass or window panes 1002 and 1017. Desiccant 1018 can absorb moisture (including humidity) between window panes 1002 and 1017. In other embodiments, the perimeter of interior seal 1016 comprises two or more separate seals 1019 that can have gaps there between. Seals 1019 can abut against glass or window panes 1002 and 1017. In the same or different embodiments, seals 1019 can be made of an inert material such as rubber or silicone. The main portion of interior seal 1016 that holds together desiccant 1018 and seals 1019 can be made of a composite material that does not off-gas in extreme high or low temperatures. In some embodiments, the main portion of interior seal 1016 can be made of an extruded material such as plastic or fiberglass. Interior seal 1016 can be adjustable by making different main portions in different lengths, which allows double-paned window frame assembly 1000 to be adjustable and to be used with walls of different widths.

Figure 11:
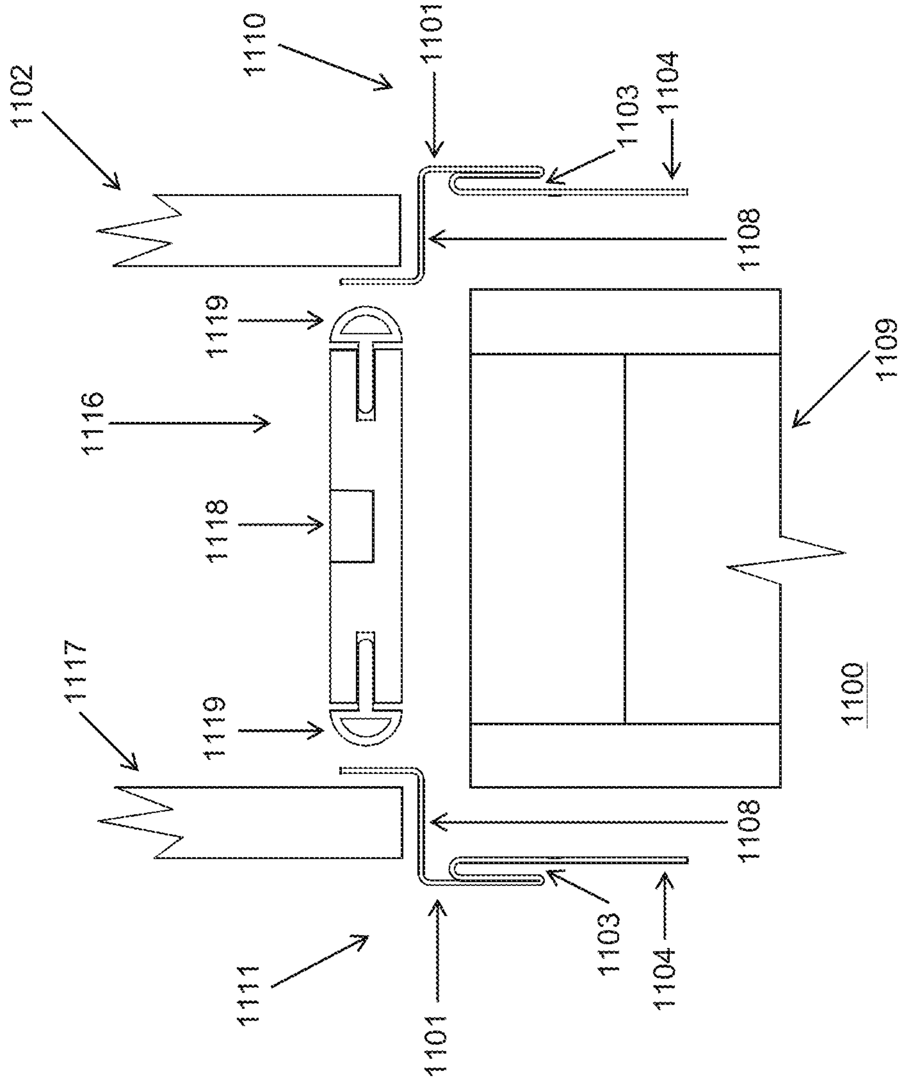
FIG. 11 illustrates an exploded view of an exemplary embodiment of a double-paned window frame assembly that is adjustable.

Continuing with the last drawing, FIG. 11 illustrates an exploded view of an exemplary embodiment of a double-paned window frame assembly 1100 that is adjustable at an end of wall 1109. The window frame assembly is shown in a top-down view.

In many embodiments, the window frame assembly can be a multi-piece assembly, where each piece is bent into its respective shape. More specifically, window frame assembly 1100 can be a two-piece assembly with portions 1110 and 1111. Portions 1110 and 1111 can be identical to each other. Each of portions 1110 and 1111 have portions 1101, 1103, 1104, and 1108.

Each of portions 1110 and 1111 can be bent into shape from a single, integrated piece of material. In the same or different embodiments, each of portions 1110 and 1111 can be made of metal, such as 20 gauge 304 stainless steel. In other embodiments, portions 1110 and 1111 can be made of a different type of metal or other material that is malleable or pliable.

The window frame assembly of FIG. 11 can be similar to the window frame assemblies of FIGS. 8-10 such that elements of FIG. 11 having reference numbers with the same last two digits as reference numbers in FIGS. 8-10 can represent similar elements in FIGS. 8-10. Both window frame assemblies in FIG. 8-10 and in FIG. 11 are adjustable to fit different sized walls or window frames with different widths.

The window frame assembly can replace the typical window trim that is often used around a window. For example, the window frame assembly of FIG. 11 can be inserted over an end of wall 1109 to serve as a window frame. Portions 1104 of window frame assembly 1100 can be attached to the wall with mechanical fasteners such as nails, rivets, and/or screws. The window frame assembly can have holes at portions 1104 to receive the mechanical fasteners. All or a portion of the window frame assembly can be flush with the end of the wall.

Ends of wall coverings (not shown in FIG. 11) that cover the wall can be inserted into the upside-down U-shaped portions on the right and left sides of the window frame assembly, as indicated by portions 1103 in FIG. 11. In many embodiments, the wall coverings can be made of composite materials such as fiber-reinforced plastic or fiber-reinforced polymer (FRP). In other embodiments, the wall coverings can be made of other materials.

Although not shown in FIG. 11, springs and/or spring covers can be attached to portions 1101 and/or 1103 of window frame assembly 1100 (and possibly the end of wall 1109), similar to how springs and spring covers inside element 205 (FIG. 2) were described above to be attached to door frame assembly 200 (FIG. 2).

As noted above, portions 1110 and 1111 of the window frame assembly of FIG. 11 make the window frame assembly adjustable to fit different sized walls or window frames with different widths.

The embodiment of the window frame assembly in FIG. 11 can use four window frame assemblies for a single window—a first window frame assembly on the left side of the window, a second window frame assembly on the right side of the window, a third window frame assembly at the top of the window, and a fourth window frame assembly at the bottom of the window. In this embodiment, the window can be square, rectangular, diamond, or another shape with four sides. In other embodiments, the window can have other shapes, and different numbers of window frame assemblies can be used accordingly. In one embodiment, the window frame assembly illustrated in FIG. 11 can be the same as each of the first, second, third, and fourth window frame assemblies when the window has a square shape. The first, second, third, and fourth window frame assemblies can have edges that are complementary to each other to allow the first and third window frame assemblies to interlock or otherwise fit together, to allow the first and fourth window frame assemblies to interlock or otherwise fit together, to allow the second and third window frame assemblies to similarly interlock or otherwise fit together, and to allow the second and fourth window frame assemblies to similarly interlock or otherwise fit together. In another embodiment, this four-piece configuration can be manufactured using a casting, welding, hydro-forming, pressing, or injecting process to create a one-piece assembly.

In assembling the window frame assemblies, four of portions 1110 and 1111, glass or window panes 1102 and 1117, and interior seal 1116 can be assembled in a manner similar to what was described above for the assembly of portions 1010 (FIG. 10) and 1111 (FIG. 10), glass or window panes 1002 (FIG. 10) and 1017 (FIG. 10), and interior seal 1016 (FIG. 10), respectively.

Interior seal 1116 is located between glass or window panes 1102 and 1117. In some embodiments, interior seal 1116 can include desiccant 1118 in a single, continuous seal around the perimeter of the window and exposed to the space between glass or window panes 1102 and 1117. Desiccant 1118 can absorb moisture (including humidity) between window panes 1102 and 1117. In other embodiments, the perimeter of interior seal 1116 comprises two or more separate seals 1119 that can have gaps there between. Seals 1119 can abut against glass or window panes 1102 and 1117. In the same or different embodiments, seals 1119 can be made of an inert material such as rubber or silicone. The main portion of interior seal 1116 that holds together desiccant 1118 and seals 1119 can be made of a composite material that does not off-gas in extreme high or low temperatures. In some embodiments, the main portion of interior seal 1116 can be made of an extruded material such as plastic or fiberglass. Interior seal 1116 can be adjustable by making different main portions in different lengths, which allows double-paned window frame assembly 1000 to be adjustable and to be used with walls of different widths.

A system has been described herein in various embodiments to comprise a frame assembly with portions for receiving wall coverings when the frame assembly is coupled to an end of a wall. In some embodiments, the frame assembly is adjustable to fit different sized walls. In the same or different embodiments, the frame assembly comprises a first portion and a second portion, the first portion comprises a groove, and the second portion fits within the groove of the first portion so that the frame assembly fits different sized walls. In the same or different embodiments, the frame assembly is a door frame assembly. In some embodiments when the frame assembly is a door frame assembly, a portion of the door frame assembly is spaced away from the end of the wall to provide a spring-like effect on a door when the door contacts the portion of the frame assembly while the door is closing. In the same or different embodiments when the frame assembly comprises a door frame assembly, the door frame assembly is adjustable to fit different sized walls. In other embodiments, the frame assembly is a window frame assembly. In some embodiments when the frame assembly comprises a window frame assembly, the window frame assembly comprises a window frame, a window pane, a spring, and a cover. In some of these embodiments, the cover fits over the spring to at least partially couple the window pane to the frame. In different embodiments when the frame assembly comprises the window frame assembly, the window frame assembly comprises two window panes and a desiccant between the two window panes. In the same or different embodiments when the frame assembly comprises the window frame assembly, the window frame assembly is adjustable to fit different size walls.

Another system has been described herein in various embodiments to comprise a frame assembly with a first portion and a second portion. In some embodiments, the frame assembly can be coupled to an end of a wall. In a number of embodiments, the second portion can be configured to be adjustably coupled to the first portion so that the frame assembly is adjustable to fit different sized walls. In certain embodiments, each of the first portion and the second portion can be bent into a respective shape from a respective single integral piece of material.

A method has been described herein in various embodiments to comprise manufacturing a frame assembly with portions for receiving wall coverings when the frame assembly is coupled to an end of a wall. In some embodiments, manufacturing the frame assembly further comprises manufacturing the frame assembly to be adjustable to fit different sized walls. In the same or different embodiments, manufacturing the frame assembly further comprises manufacturing a first portion comprising a groove, and manufacturing a second portion to fit within the groove of the first portion so that the frame assembly fits different sized walls. In the same or different embodiments, manufacturing the frame assembly further comprises manufacturing a door frame assembly. In some embodiments when the frame assembly comprises a door frame assembly, manufacturing the door frame assembly comprises manufacturing a portion of the door frame assembly to be spaced away from the end of the wall to provide a spring-like effect on a door when the door contacts the portion of the frame assembly while the door is closing. In the same or different embodiments when the frame assembly comprises a door frame assembly, manufacturing the door frame assembly to be adjustable to fit different sized walls. In other embodiments, manufacturing the frame assembly further comprises manufacturing a window frame assembly. In some embodiments when the frame assembly comprise a window frame assembly, manufacturing the window frame assembly comprises manufacturing the window frame assembly to comprise a window frame, a window pane, a spring, and a cover. In some of these embodiments, the cover fits over the spring to at least partially couple the window pane to the frame. In the same or different embodiments when the frame assembly comprises the window frame assembly, manufacturing the window frame assembly comprises manufacturing the window frame assembly to comprise two window panes and a desiccant between the two window panes. In the same or different embodiments when the frame assembly comprises the window frame assembly, manufacturing the window frame assembly comprises manufacturing the window frame assembly to be adjustable to fit different size walls.

Another method has been described herein in various embodiments to comprise manufacturing a frame assembly with a first portion and a second portion. In some embodiments, the frame assembly can be coupled to an end of a wall. In a number of embodiments, the second portion can be adjustably coupled to the first portion so that the frame assembly is adjustable to fit different sized walls. In certain embodiments, manufacturing the frame assembly can further comprise bending each of the first portion and the second portion into a respective shape from a respective single integral piece of material.

A further method has been described herein in various embodiments to install a frame assembly with a first portion and a second portion. The frame assembly can be configured to be coupled to an end of a wall. The second portion can be configured to be adjustably coupled to the first portion so that the frame assembly is adjustable to fit different sized walls. Also, each of the first portion and the second portion can have a respective shape bent from a respective single integral piece of material.

In the foregoing specification, door frames, window frames, and their related methods have been described with reference to a number of exemplary embodiments. Various modifications and changes may be made, however, without departing from the scope of the construction element as set forth in the claims. The specification and figures are illustrative, rather than restrictive, and modifications are intended to be included within the scope of any construction element. Accordingly, the scope of any construction element should be determined by the claims and their legal equivalents rather than by merely the exemplary embodiments described.

For example, the steps recited in any method or process claims may be executed in any order and are not limited to the specific order presented in the claims. Additionally, the components and/or elements recited in any physical embodiment claims may be assembled or otherwise operationally configured in a variety of permutations and are accordingly not limited to the specific configuration recited in the claims. As another example, door 202 in FIG. 2 and/or door 702 in FIG. 7 can have a door seal or gasket, similar to door seal or gasket 514 of door 502 in FIG. 5.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

Although the door frames, window frames, and their related methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. As another example, one or more of the procedures, processes, or activities may include different procedures, processes, and/or activities and be performed in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims, and (2) are or are potentially equivalents of express elements and/or limitations in the claims under the doctrine of equivalents.

What is claimed is:

1. A system comprising:

a frame assembly with a first portion, a second portion, a spring, and a cover, wherein:

the frame assembly is configured to be coupled to an end of a wall;

the second portion is configured to be adjustably coupled to the first portion along an end surface of the end of the wall so that the frame assembly is adjustable to fit different sized walls;

each of the first portion and the second portion is bent into a respective shape from a respective single integral piece of material;

one of the first portion or the second portion comprises a bump, wherein when the frame assembly is coupled to the end of the wall, the bump is spaced away from the end surface of the end of the wall to provide a spring-like effect to: (a) a door in contact with the bump when the door is closing, or (b) a window pane secured to the frame assembly;

the spring is configured to be coupled to an outer surface of the first portion or the second portion; and the cover is configured to fit over the spring.

2. The system of claim 1, wherein:

at least one of the first portion or the second portion comprises an end portion bent to form a groove configured to receive a wall covering when the frame assembly is coupled to the end of the wall.

3. The system of claim 1, wherein:

the first portion comprises a groove; and the second portion is configured to adjustably fit within the groove of the first portion so that the frame assembly fits different sized walls.

4. The system of claim 3, wherein:

the frame assembly further comprises a gasket; and the gasket acts as a joint between the first portion and the second portion at or near the groove of the first portion when the frame assembly is coupled to the end of the wall.

5. The system of claim 1, wherein:

the frame assembly is a door frame assembly.

6. The system of claim 1, wherein:

the bump is part of the respective single integral piece of material of the first portion or the second portion.

7. The system of claim 1, wherein:

the frame assembly is a window frame assembly.

8. The system of claim 7, wherein:

the window frame assembly comprises:

a window frame comprising the first portion and the second portion; and the window pane.

9. The system of claim 8, wherein:

the cover is further configured to at least partially couple the window pane to the window frame.

10. The system of claim 7, wherein:

the window frame assembly comprises:

two window panes; and a desiccant between the two window panes and configured to absorb moisture.

11. A method comprising:

manufacturing a frame assembly with a first portion, a second portion, a spring, and a cover, wherein:

the frame assembly is configured to be coupled to an end of a wall;

the second portion is configured to be adjustably coupled to the first portion along an end surface of the end of the wall so that the frame assembly is adjustable to fit different sized walls;

the spring is configured to be coupled to an outer surface of the first portion or the second portion; and the cover is configured to fit over the spring; and manufacturing the frame assembly further comprises:

bending each of the first portion and the second portion into a respective shape from a respective single integral piece of material; and forming a bump on one of the first portion or the second portion, wherein when the frame assembly is coupled to the end of the wall, the bump is spaced away from the end surface of the end of the wall to provide a spring-like effect to: (a) a door in contact with the bump when the door is closing, or (b) a window pane secured to the frame assembly.

12. The method of claim 11, wherein:

manufacturing the frame assembly further comprises:

bending an end portion of at least one of the first portion or the second portion to form a groove configured to receive a wall covering when the frame assembly is coupled to the end of the wall.

13. The method of claim 11, wherein:

manufacturing the frame assembly further comprises:

manufacturing the first portion comprising a groove; and manufacturing the second portion to adjustably fit within the groove of the first portion so that the frame assembly fits different sized walls.

14. The method of claim 13, wherein:

manufacturing the frame assembly further comprises:

providing a gasket to act as a joint between the first portion and the second portion at or near the groove of the first portion when the frame assembly is coupled to the end of the wall.

15. The method of claim 11, wherein:

manufacturing the frame assembly further comprises:

manufacturing a door frame assembly adjustable to fit different sized walls.

16. The method of claim 11, wherein:

manufacturing the frame assembly comprises:

the bump is part of the respective single integral piece of material of the first portion or the second portion.

17. The method of claim 11, wherein:

manufacturing the frame assembly further comprises:

manufacturing a window frame assembly adjustable to fit different sized walls.

18. The method of claim 17, wherein:

manufacturing the window frame assembly comprises:

manufacturing the window frame assembly to comprise:

a window frame comprising the first portion and the second portion; and the window pane.

19. The method of claim 18, wherein:

the cover is further configured to at least partially couple the window pane to the window frame.

20. The method of claim 17, wherein:

manufacturing the window frame assembly comprises:

manufacturing the window frame assembly to comprise:

two window panes; and a desiccant between the two window panes and configured to absorb moisture.

21. A method comprising:

installing a frame assembly with a first portion, a second portion, a spring, and a cover, wherein:

the frame assembly is configured to be coupled to an end of a wall;

the second portion is configured to be adjustably coupled to the first portion along an end surface of the end of the wall so that the frame assembly is adjustable to fit different sized walls;

each of the first portion and the second portion has a respective shape bent from a respective single integral piece of material;

one of the first portion or the second portion comprises a bump, wherein when the frame assembly is coupled to the end of the wall, the bump is spaced away from the end surface of the end of the wall to provide a spring-like effect to: (a) a door in contact with the bump when the door is closing, or (b) a window pane secured to the frame assembly;

the spring is configured to be coupled to an outer surface of the first portion or the second portion; and the cover is configured to fit over the spring.

* * * * *